US008849804B1

(12) United States Patent
Law et al.

(10) Patent No.: US 8,849,804 B1
(45) Date of Patent: Sep. 30, 2014

(54) DISTRIBUTING INTEREST CATEGORIES WITHIN A HIERARCHICAL CLASSIFICATION

(75) Inventors: Ching Law, Yoho (HK); Ting Liu, San Jose, CA (US); Jonathan Michael Krafcik, Kirkland, WA (US)

(73) Assignee: Google Inc., Mountain View, CA (US)

( * ) Notice: Subject to any disclaimer, the term of this patent is extended or adjusted under 35 U.S.C. 154(b) by 18 days.

(21) Appl. No.: 13/572,460

(22) Filed: Aug. 10, 2012

(51) Int. Cl.
  *G06F 7/00* (2006.01)
  *G06F 17/30* (2006.01)
(52) U.S. Cl.
  USPC .......................................................... 707/722
(58) Field of Classification Search
  None
  See application file for complete search history.

(56) References Cited

U.S. PATENT DOCUMENTS

| | | | |
|---|---|---|---|
| 5,754,939 A | 5/1998 | Herz et al. | |
| 5,933,827 A * | 8/1999 | Cole et al. | 1/1 |
| 7,089,237 B2 * | 8/2006 | Turnbull et al. | 1/1 |
| 7,130,866 B2 | 10/2006 | Schaffer | |
| 7,613,664 B2 | 11/2009 | Riezler et al. | |
| 7,698,261 B1 * | 4/2010 | Khoshnevisan | 707/999.003 |
| 8,538,836 B1 * | 9/2013 | Scott et al. | 705/27.2 |
| 2005/0222989 A1 * | 10/2005 | Haveliwala et al. | 707/3 |
| 2006/0242147 A1 * | 10/2006 | Gehrking et al. | 707/7 |
| 2007/0016556 A1 * | 1/2007 | Ann et al. | 707/3 |
| 2007/0100796 A1 * | 5/2007 | Wang | 707/3 |
| 2010/0250558 A1 * | 9/2010 | Wang | 707/749 |
| 2011/0016206 A1 | 1/2011 | Kodialam et al. | |
| 2012/0072284 A1 * | 3/2012 | Wang et al. | 705/14.53 |

* cited by examiner

*Primary Examiner* — Robert Beausoliel, Jr.
*Assistant Examiner* — Michael Pham
(74) *Attorney, Agent, or Firm* — Foley & Lardner LLP; John D. Lanza (57) ABSTRACT

Methods and systems for distributing interest categories within a hierarchical classification, wherein a parent interest category is identified and the hierarchical classification is filtered. A sub-interest category is extracted, based on the filtering, and a weighting associated with the sub-interest category is transferred into the parent interest category. The weighting is distributed in the hierarchical classification.

19 Claims, 5 Drawing Sheets

DISTRIBUTING INTEREST CATEGORIES WITHIN A HIERARCHICAL CLASSIFICATION

BACKGROUND

The present disclosure relates generally to distributing interest categories within a hierarchical classification.

SUMMARY

In one implementation, in general, a computer-implemented method may include storing a plurality of search results for queries. The method may also include identifying a parent interest category from the search results, wherein the parent interest category comprises a top level of a hierarchical classification of the plurality of search results for queries. The method may also include filtering the hierarchical classification of search results for queries. The method may yet further include based on the filtering, extracting a sub-interest category and transferring a weighting associated with the sub interest category into the parent interest category. The method may include distributing the weighting of the sub-interest category to the hierarchical classification of the search results.

In another implementation, in general, a computer-implemented method may include storing a plurality of web pages in response to a search query. The method may also include identifying a parent interest category from the web pages, wherein the parent interest category comprises a top level of a hierarchical classification of the plurality of landing web pages. The method may yet further include filtering the hierarchical classification of web pages. The method may include based on the filtering, extracting a sub-interest category from the web page and transferring a weighting associated with a sub-interest category into the parent interest category. The method may also include distributing the weighting of the transferred sub-interest category to the hierarchical classification of the web pages.

In another implementation, in general, a system may include a tangible computer-readable storage device comprising instructions; and one or more processors coupled to the tangible computer-readable storage device and configured to execute the instructions to perform operations. The operations may include storing a plurality of web pages in response to a search query. The operations may also include identifying a parent interest category from the web pages, wherein the parent interest category comprises a top level of a hierarchical classification of the plurality of web pages. The operations may include filtering the hierarchical classification of web pages. The operations may also include, based on the filtering, extracting a sub-interest category from the web page and transferring a weighting associated with the sub-interest category into the parent interest category. The method may include distributing the weighting of the transferred sub-interest category to the hierarchical classification of the web pages.

BRIEF DESCRIPTION OF THE DRAWINGS

The details of one or more implementations of the interest described in this specification are set forth in the accompanying drawings and the description below. Other features, aspects, and advantages of the interest will become apparent from the description, the drawings, and the claims.

DETAILED DESCRIPTION

It is helpful for a content provider to select content that is relevant or of interest to a user, viewer, etc. of the content. Interests associated with the user may be compiled and stored in a server for efficient retrieval at serving time of the content. However, memory and server space may be expensive and, therefore, a limited resource in the number of interests that may be stored for any single user, viewer, etc. In some implementations, the interests associated with the user may be based on impertinent information, such as information that is not strong enough to select relevant content for the user.

For providing efficient storage and relevant content, it may be helpful to aggregate less relevant user interests, instead of eliminating user interests, which may lead to bias within a user's profile. To preserve the unbiased nature of the user's profile, a system for removing, yet preserving, the less relevant user interests may be implemented.

A user may opt in or out of allowing a content selection service to store and use data regarding online actions performed by the user. Moreover, the user may be represented in the service as a randomized user identifier that contains no personally-identifiable information about the user. For example, information relating to the user's name and/or demographics may not be used by the content selection service to select relevant content for the user, unless the user has opted in to allowing the service to use such information. A user identifier may be related to, or may itself be, a client identifier that identifies the user's device to the content selection service (e.g., a cookie set on the device, an IP address of the device, etc.). In some implementations, a user identifier may be associated with multiple client identifiers. For example, a user identifier may be associated with a client identifier for the user's mobile telephone and a second client identifier for the user's home computer.

Figure 1:
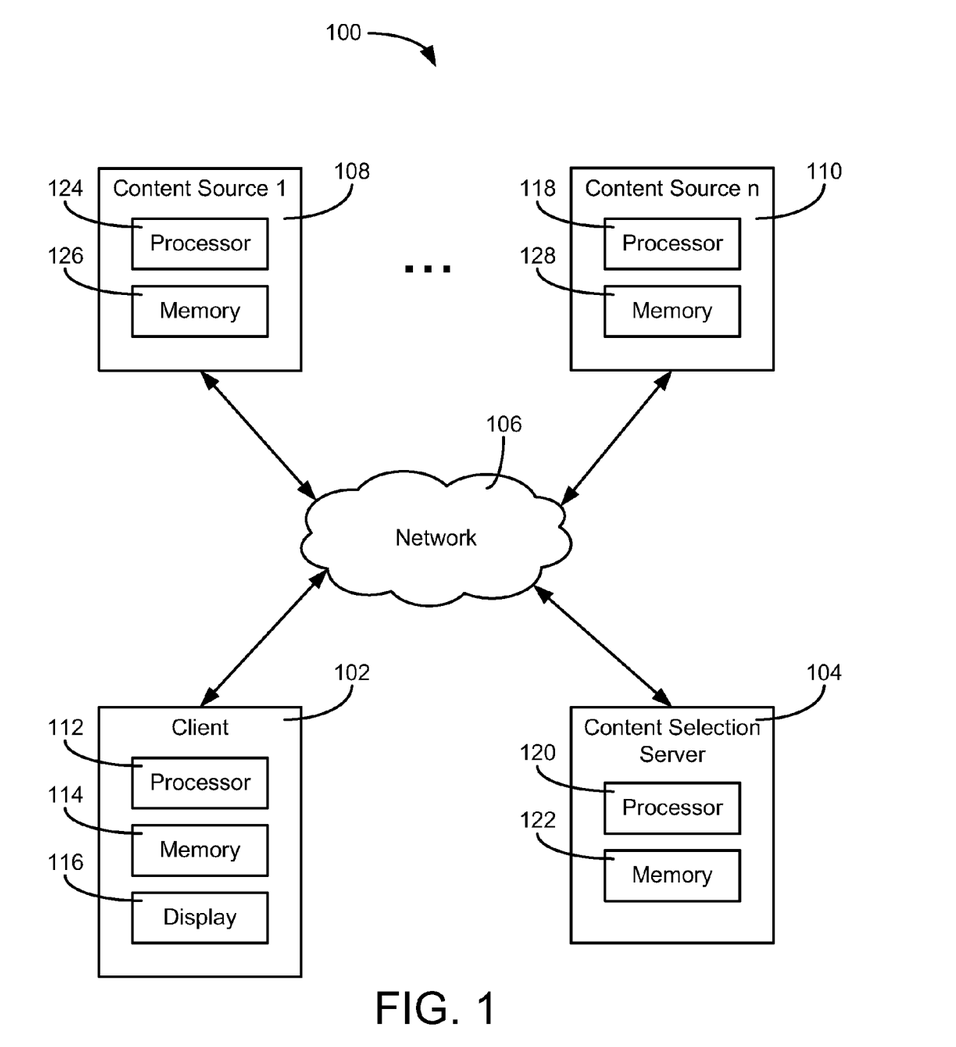
FIG. 1 is a block diagram of a computer system in accordance with a described implementation.

FIG. 1 is a block diagram of a computer system 100 in accordance with a described implementation. System 100 includes client 102, which may communicate with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to client 102. System 100 may include an content selection server 104, which provides content to other computing devices over network 106.

Network 106 may be any form of computer network that relays information between client 102, content selection server 104, and content sources 108, 110. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from content selection server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, content selection server 104 may include a processing circuit including a processor 120 and a memory 122. In some implementations, content selection server 104 may include several computing devices (e.g., a data center, a network of servers, etc.). In such a case, the various devices of content selection server 104 may comprise a processing circuit (e.g., processor 120 represents the collective processors of the devices and memory 122 represents the collective memories of the devices).

Content selection server 104 may provide content to client 102 via network 106. For example, content source 108 may provide a webpage to client 102, in response to receiving a request for a webpage from client 102. In some implementations, content from content selection server 104 may be provided to client 102 indirectly. For example, content source 108 may receive content from content selection server 104 and use the content as part of the webpage data provided to client 102. In other implementations, content from content selection server 104 may be provided to client 102 directly. For example, content source 108 may provide webpage data to client 102 that includes a command to retrieve content from content selection server 104. On receipt of the webpage data, client 102 may retrieve content from content selection server 104 based on the command and display the content when the webpage is rendered on display 116.

Figure 2:
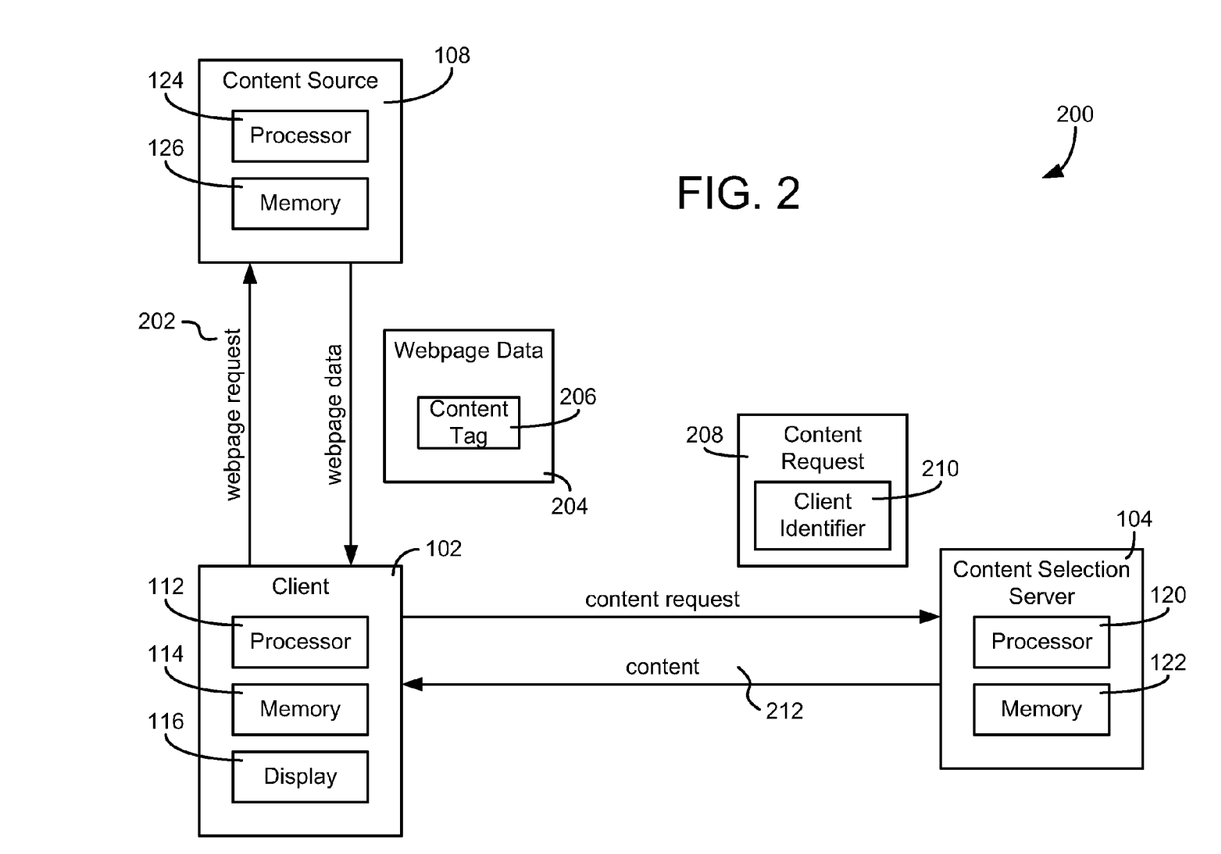
FIG. 2 is an example illustration of content being selected by content selection server in accordance with a described implementation.

FIG. 2 is an example illustration of content 212 being selected by content selection server 104. As shown, client 102 may send a webpage request 202 to a content source via network 106, such as content source 108. For example, webpage request 202 may be a request that conforms to the hypertext transfer protocol (HTTP), such as the following:

GET/weather.html HTTP/1.1
Host: www.example.org

Such a request may include the name of the file to be retrieved, weather.html, as well as the network location of the file, www.example.org. In some cases, a network location may be an IP address or may be a domain name that resolves to an IP address of content source 108. In some implementations, a client identifier, such as a cookie associated with content source 108, may be included with webpage request 202 to identify client 102 to content source 108.

In response to receiving webpage request 202, content source 108 may return webpage data 204, such as the requested file, "weather.html." Webpage data 204 may be configured to cause client 102 to display a webpage on electronic display 116 when opened by a web browser application. In some cases, webpage data 204 may include code that causes client 102 to request additional files to be used as part of the displayed webpage. For example, webpage data 204 may include an HTML image tag of the form:

<img src="Monday_forecast.jpg">

Such code may cause client 102 to request the image file "Monday_forecast.jpg," from content source 108.

In some implementations, webpage data 204 may include content tag 206 configured to cause client 102 to retrieve content from content selection server 104. In some cases, content tag 206 may be an HTML image tag that includes the network location of content selection server 104. In other cases, content tag 206 may be implemented using a client-side scripting language, such as JavaScript. For example, content tag 206 may be of the form:

<script type='text/javascript'>
ContentNetwork_RetrieveContent("argument")
</script>

Where ContentNetwork_RetrieveAd is a script function that causes client 102 to send an content request 208 to content selection server 104. In some cases, the argument of the script function may include the network address of content selection server 104, the referring webpage, and/or additional information that may be used by content selection server 104 to select content to be included with the webpage.

Content request 208 may include a client identifier 210, used by content selection server 104 to identify client 102. In various implementations, client identifier 210 may be an HTTP cookie previously set by content selection server 104 on client 102, the IP address of client 102, a unique device serial for client 102, other forms of identification information, or combinations thereof. For example, content selection server 104 may set a cookie that includes a unique string of characters on client 102 when content is first requested by client 102 from content selection server 104. Such a cookie may be included in subsequent content requests sent to content selection server 104 by client 102.

In some implementations, client identifier 210 may be used by content selection server 104 to store history data for client 102, with the permission of the user of client 102. For example, content request 208 may include data relating to which webpage was requested by client 102, when the webpage was requested, and/or other history data. Whenever client 102 visits a webpage participating in the content network, i.e., a webpage that includes content selected by content selection server 104, content selection server 104 may receive and store history data for client 102. In this way, content selection server 104 is able to reconstruct the online history of client 102 regarding webpages in the content network. In some implementations, content selection server 104 may also receive history data for client 102 from entities outside of the content network. For example, a website that does not use content selected by content selection server 104 may nonetheless provide information about client 102 visiting the website to content selection server 104, with the user's permission.

In some cases, client identifier 210 may be sent to content selection server 104 when the user of client 102 performs a particular type of online action. For example, webpage data 204 may include a tag that causes client 102 to send client identifier 210 to content selection server 104 when displayed content is selected by the user of client 102. Client identifier 210 may also be used to record information after client 102 is redirected to another webpage. For example, client 102 may be redirected to an advertiser's website if the user selects a displayed content. In such a case, client identifier 210 may also be used to record which actions were performed on the advertiser's website. For example, client identifier 210 may also be sent to content selection server 104 as the user of client 102 navigates the advertiser's website. In this way, data regarding whether the user searched for a product, added a product to a shopping cart, completed a purchase on the advertiser's website, etc., may also be recorded by content selection server 104. In some implementations, content selection server 104 may use the data regarding users' online actions to calculate performance metrics for a webpage (e.g., a conversion rate, a click-through rate, etc.).

In response to receiving content request 208, content selection server 104 may select content 212 to be returned to client 102 and displayed on display 116. For example, content selection server 104 may select content 212 based on client identifier 210 and/or on a user identifier associated with client identifier 210. In one implementation, content selection server 104 may determine whether client identifier 210 corresponds to a similar user identifier as that of one or more other user identifiers. For example, content selection server 104 may determine whether a client identifier for client 102 is associated with characteristics that are similar to that of one or more other user identifiers specified by an advertiser. Content selection server 104 may analyze history data for the one or more user identifiers specified by the advertiser to identify characteristics of the user identifiers. The characteristics may be compared to those of the user identifier associated with client 102 to determine its similarity. In some implementations, content selection server 104 may determine a similarity score to represent how similar the characteristics of the user identifier is to that of the user identifiers specified by the advertiser.

In some implementations, content selection server 104 may use characteristics of the one or more user identifiers specified by an advertiser or other content source to train a behavioral model. For example, a large number of user identifiers associated with online purchases of insurance may have recently visited a webpage that compares rates among different insurance carriers. Such a characteristic may be used in a behavioral model by content selection server 104 to identify other user identifiers of users that may also be interested in purchasing insurance. In some implementations, the behavioral model may be constructed by representing a user identifier as a set of feature vectors. In general, a feature vector refers to an n-dimensional vector of characteristics of a user identifier, such as information about online actions associated with the user identifier. Characteristics of a user identifier may include webpages visited by the user identifier, content selected by the user identifier, and/or content selected by the user identifier that led to a conversion. In general, a conversion refers to the performance of a certain action. Typically, the action is the purchase of a good or service. For example, selected content that led to a conversion may be content that diverted a client device to a website at which a purchase was made. Other examples of conversions include creating a user profile on a website, subscribing to receive marketing offers (e.g., by providing a postal or email address, by providing a telephone number, etc.), or downloading software from a website.

In some implementations, characteristics of user identifiers may be normalized by utilizing a term-frequency inverse document frequency (TF-IDF) count. Webpages visited by a user identifier may be represented by their uniform resource location (URL) or similar addresses. Selected content may be content embedded into a webpage, a game, pop-up content, textual content, banner content, or the like.

In some implementations, content selection server 104 may aggregate feature vectors to find a set of characteristics based on a statistical measurement of the aggregated characteristics. For example, the aggregated characteristics may be the number of times a webpage was visited by the set of user identifiers, the number of times content was selected, and/or the number of times content led to a conversion. In various implementations, a statistical measurement of the aggregated characteristics may be the average, median, centroid, or other statistical measure of the aggregated characteristics. In one implementation, the aggregated characteristics having the highest amount of activity may be selected (e.g., the top five most visited webpages, the top ten selected content items, etc.).

A received set of user identifiers may be subdivided by content selection server 104 into clusters to generate the behavioral model, in one implementation. In some cases, different groups of user identifiers may be associated with the same event and may be associated with widely different interests and motivations. For example, a roll of copper tubing may be purchased from an online hardware store both by plumbers and by hobbyists that homebrew beer. In such a case, the online histories for these two groups may widely differ. For example, the short-term histories of the plumbers may include a number of webpages devoted to making a certain type of plumbing repair. Likewise, the short-term histories of the hobbyists may include a number of webpages devoted to do-it-yourself projects to make a heat sink using copper tubing. Using clustering allows for the different groups of user identifiers to be treated separately in the behavioral model.

In some implementations, feature vectors may be subdivided into clusters by computing a weighted nearest-neighbor list for each user identifier in the set of user identifiers that content selection server 104 uses to train the behavioral model. For example, the feature vectors may be analyzed by content selection server 104 to determine which vectors are closest to one another. In one implementation, the nearest-neighbor list for the received set of user identifiers may be determined by applying a k-nearest-neighbor (KNN) algorithm, or similar algorithm, to the feature vectors. For example, webpages visited by plumbers may be used to form one cluster, while webpages visited by home brewing hobbyists may be used to form a second cluster, based on their nearest neighbors.

In some implementations, content selection server 104 may calculate a similarity score for the user identifier associated with client 102 based on how similar the characteristics of the user identifier are to those of one or more user identifiers specified by an auction participant (e.g., an advertiser or other content provider). For example, an advertiser may send a request to content selection server 104 to identify a user identifier similar to one or more user identifiers specified by the advertiser. Content selection server 104 may determine whether the user identifier associated with client 102 is a similar user identifier and generate a similarity score for the user identifier. In some implementations, content selection server 104 may automatically generate a bid for the advertiser or other content provider, in response to content selection server 104 receiving content request 208 from client 102. For example, if the user identifier of client 102 is determined to be similar to user identifiers specified by an advertiser, content selection server 104 may generate a bid in the auction on behalf of the advertiser. In one implementation, the bid may be determined by content selection server 104 based in part on the similarity score for the user identifier associated with client 102. Based on the results of the auction, content selection server 104 may select content 212 and return the content to client 102 or return an instruction to client 102 configured to cause client 102 to retrieve content from another source.

Figure 3:
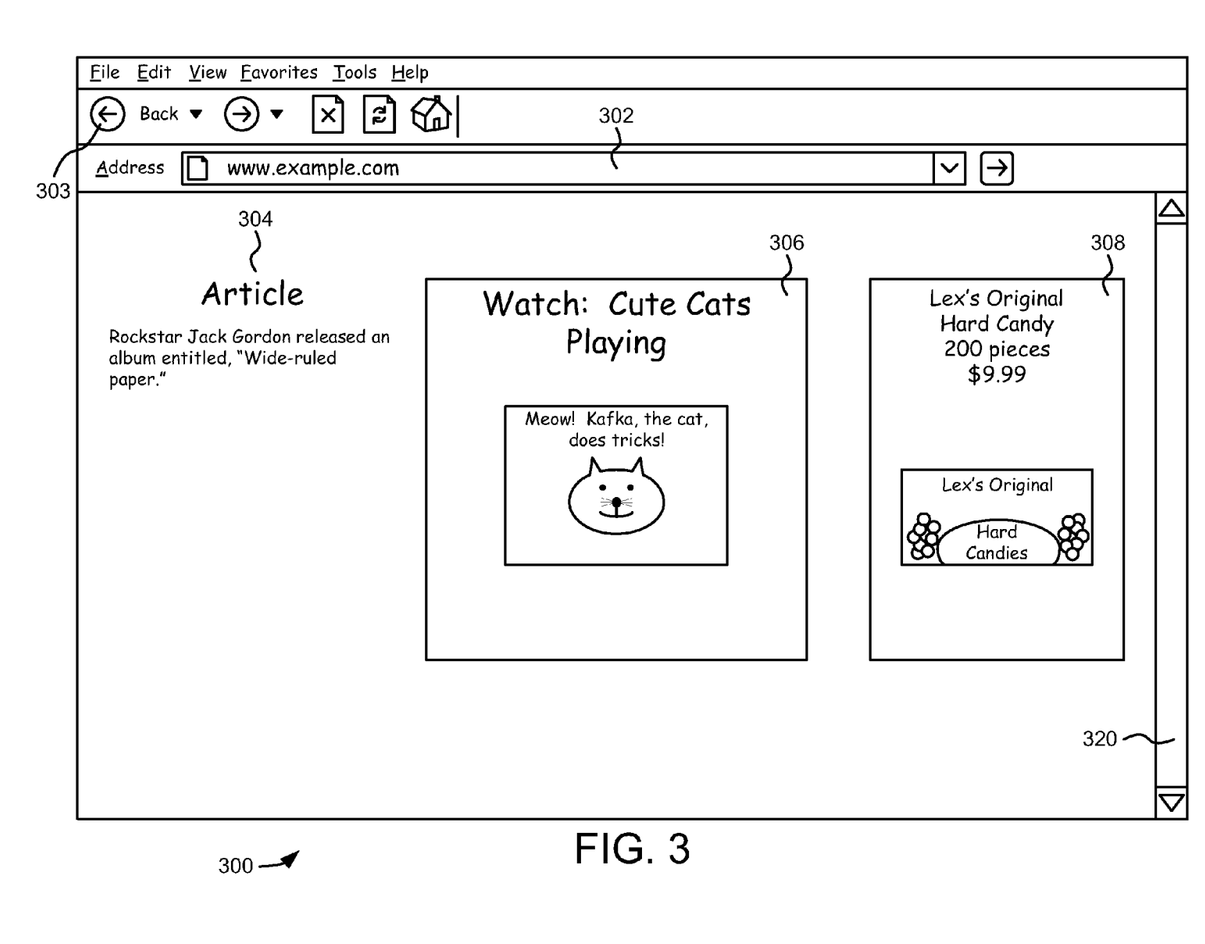
FIG. 3 is an illustration of content in accordance with a described implementation.

FIG. 3 is an illustration of content in accordance with a described implementation. Web page 300 may include various types of content including, but not limited to, text, video, graphics, images, etc. As illustrated in FIG. 2, web page 300 may designate a content area for placement of content, such as articles 304, videos 306, or content related to a content-provider ("related content") 308. Related content 308 may be graphical, text-only, image, video, audio, etc. Related content 308 may include executable code, or any other media, content, interactivity, etc. Related content 308 may include embedded data, such as hyperlinks, metadata, and/or machine executable instructions. Related content 308 may include information specified by an application and/or content provider, depending on the type of related content 308.

Web page 300 may be rendered in various ways. For example, a content provider may receive a query request (e.g., a content request, a search request, etc.) from a client device. In response, the content provider may retrieve relevant search results for the query from an index of documents of web pages, which may be stored in a repository. The content provider may retrieve relevant content for the query by providing the request to the content selection server. The content request may include the number of desired content items (e.g., articles, advertisements, etc.). The number of desired content items may depend on search results, display screen occupied by the results or other content items, the size or shape of the content items, etc. The content request may also include the search query, information based on the query (e.g., browser identifier, cookie, keywords, geographical location, etc.), etc.

A client device (e.g., a computer, portable electronic device, mobile communication device, set-top box, radio, television, etc.) may provide the content request to a content provider. In FIG. 3, reference is made to an online example, web page 300, where a web page request is received for providing content 304, 306, 308 of a content provider. In other implementations, other forms of content, such as print, radio, broadcast, etc., may be the form of distribution. Content 304, 306, 308 may be provided to the client device in response to the content request. The content may include executable instructions, e.g., JavaScript, that may be executed at the client device to request content from the content selection server.

Content may also be provided to content providers. For example, a content provider may submit content requests for content to the content selection server. The content selection server may then provide content for placement on the content provider's properties (e.g., website, other network-distributed properties, etc.). The content may include embedded links, a category relating to the content or the content request, a portion of the content request, type (e.g., text, video, image, etc.), location information, etc.

The client device may provide web page 300 in a browser, viewer, or other content display system. In some implementations, the web browser application may operate by receiving input of a uniform resource locator (URL) via a field 302, from an input device (e.g., a pointing device, a keyboard, a touchscreen, etc.). For example, the URL, http://www.example.com, may be entered into field 302. Processor 112 may use the inputted URL to request data from a content source having a network address that corresponds to the entered URL. In response to the request, the content source may return webpage data and/or other data to client 102 which may be used by client 102 to cause visual indicia to be displayed by electronic display 116.

The web browser displayed on electronic display 116 may include a number of navigational controls associated with webpage 300. For example, the web browser may include the ability to go back or forward to other webpages using inputs 303 (e.g., a back button, a forward button, etc.). The web browser may also include one or more scroll bars 320, which can be used to display parts of webpage 300 that are currently off-screen. For example, webpage 300 may be formatted to be larger than the screen of electronic display 116. In such a case, the one or more scroll bars 320 may be used to change the category and/or horizontal position of webpage 300 on electronic display 116.

In some implementations, content 308 may be content determined to be of interest to the user of client 104. Content 308 may be selected using a client identifier provided to content selection server 104 when client 102 requests a content item. Such an identifier may be associated with an interest category (IC) profile for the user of client 102. For example, if client 102 was previously used to research automobiles, the IC profile generated for the user may include an interest category of automobiles. Although webpage 300 is unrelated to automobiles, the IC profile of the user of client 102 may be used by content providers to provide content of interest to the user. For example, a content provider that sells cars may pay to include content 308 on webpage 300 when the user of client 102 requests webpage 300. In some implementations, the client device may provide information about the content 304, 306, 308 back to the content selection server, which may include data relating to how, where, when, etc. the content was rendered.

Figure 4A:
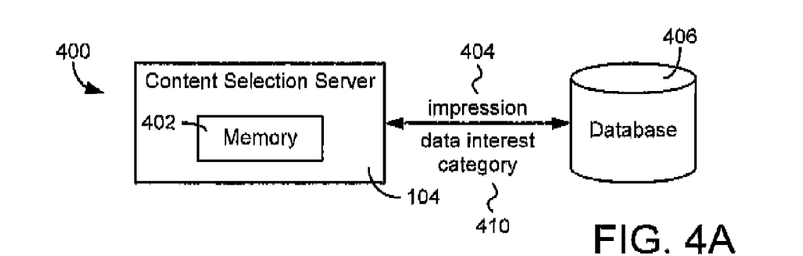
FIG. 4A is an illustration of storing the content in accordance with a described implementation.

FIG. 4A is an illustration of storing the content in accordance with a described implementation. Content 304, 306, 308 may be stored as interest category (IC) data 410 or impression 404 (i.e., the content is displayed to the user of client 102). Impressions 404 and IC data 410 may be collected using a subject matter taxonomy (e.g., specific categories to organize content, such as finance, autos, telecommunications, entertainment, technology, etc.). For example, there may be x number of categories for any given impression. IC data 410 may be collected into a category that may be associated with a user.

Impressions 404 may include history data, which may include search query data from a search engine, such as information retrieval scores, position data of the order of the search results, etc. The history data may include queries relating to a user. In some implementations, content selection server 104 may classify the history data as being long-term, short-term, or current history data, to identify an interest category as being a long-term, short-term, or current interest. For example, the webpage being visited by client 102 may be analyzed to determine one or more current interest categories for the user identifier associated with client 102. Short-term history may be any data from an intermediate time period between the current history and long-term history. For example, the short-term history may be from the previous hour or day. Long-term history data may be any data from a time period preceding the short-term time period. For example, long-term history data may be history data regarding actions performed between the previous day and one month prior. Content selection server 104 may use the current, short-term, and long-term interest categories to generate an interest category profile. In some cases, a weighting may be applied to an interest category based on its type and/or a potential strength of the interest category. For example, a current interest category may receive a greater weighting than a long-term interest category. In another example, an interest category identified from ten website visits may receive a greater weight than an interest category identified from a single website visit.

IC data 410 may include multiple sub-profiles, e.g., each sub-profile classifying an aspect of the user according to criteria. In some implementations, IC data 410 may include a profile corresponding to a group of users, such as users sharing a client device. IC data 410 may include a profile that may include one or more interest categories that represent topical categories in which a user may be interested. In some implementations, interest categories used by content selection server 104 may be predefined and may follow a hierarchical taxonomy. For example, the interest category of golf may be a subset of the interest category of sports (e.g., the interest category of golf may be represented as /Sports/Golf).

Content selection server 104 may provide impression 404 or user profile data 410 from memory 402 to database 406 for storage. Database 406 may be a repository, data structure (e.g., mapped in memory), relational database, file server, etc.

Figure 4B:
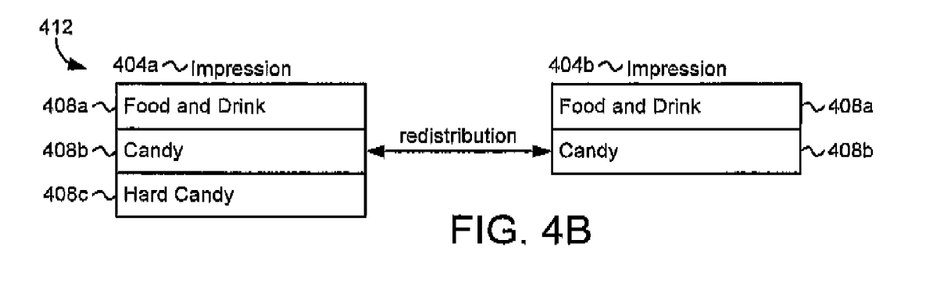
FIG. 4B is an illustration of distribution of categories in accordance with a described implementation.

FIG. 4B illustrates a distribution of categories in accordance with a described implementation. Impression 404a (related to content 308) may include a number of categories (user interest, attributes, etc.) 408a-c organized as table 412. Table 412 illustrates a number of attributes relating to impression 404a. In some implementations, table 412 may organize the attributes related to weight, e.g., how many times the user has viewed, accessed, etc. In other implementations, table 412 may organize the attributes depending according to a parent/child configuration as shown in FIG. 4B.

Table 412 may relate to content 308. For example, a user may access, view, etc. content 308, which may be stored as impression 404a. Impression 404a, which depicts content relating to hard candies may be organized in a number of categories. Category 408a, food and drink, may be considered as the parent category. Category 408b, candy, may be considered as the intermediate level or child category. Category 408c, hard candy, may be considered as the sub-category.

In some implementations, the system may determine that impression 404a may be stored in a repository. In another implementation, the system may determine that impression 404a can be updated with the value of the interest category data determined to be the most significant. For example, redistribution of the categories may take place within the impression. In impression 404b, category 408c is removed, because the system determined that category 408c is less relevant than the other categories within impression 404b. Category 408c may be redistributed among impression 404b according to the system.

Figure 5A:
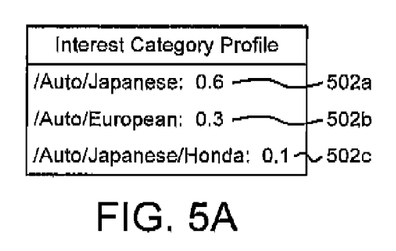
FIG. 5A is an illustration of a browser history profile and categories in accordance with a described implementation.
Figure 5B:
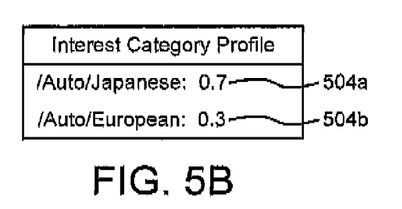
FIG. 5B is an illustration of a browser history profile and the distribution of categories in accordance with a described implementation.
Figure 5C:
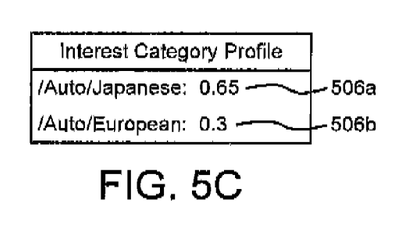
FIG. 5C is an illustration of a browser history profile and the weighting of categories in accordance with a described implementation.

FIGS. 5A-5C are an illustration of an interest category profile in accordance with a described implementation. The system may include removing a less relevant user interest or category from interest category profile 500. Categories 502a-c may generally refer to specific services, products, keywords, etc. Categories 502a-c may be general (parent), such as products, intermediate/specific (child), such as the product name. If one of the categories is removed from the interest category profile, then the weight of that category may be reassigned to the parent. For example, in FIG. 5A, the interest category profile may include the following categories:

/Auto/Japanese: 0.6 (502a)
/Auto/European: 0.3 (502b)
/Auto/Japanese/Honda: 0.1 (502c)

If child category 502c, "/Auto/Japanese/Honda" is removed, then the weight of 0.1 may be transferred to the parent category, "/Auto/Japanese," in FIG. 5B, which changes the interest category profile to the following:

/Auto/Japanese: 0.7 (504a)
/Auto/European: 0.3 (504b)

In FIG. 5C, a discount may be applied when the weight of child category 502c is transferred to parent category 504a. For example, a discount of 50% may be applied, then the interest category profile includes the following:

/Auto/Japanese: 0.65 (506a)
/Auto/European: 0.3 (506b)

In FIG. 5C, discounting may be performed using multiple iterations until the number of categories is within a number that may be efficiently stored and retrieved by the system. A taxonomy including the categories may be implemented as a tree so that the parent category is easily located.

The interest category profiles and the associated numbers may be used to provide relevant content to the user. For example, the associated numbers may be used as a signal for selection of advertisements from a content selection server. In another implementation, the associated numbers may be used to recommend additional content to the user.

Figure 6:
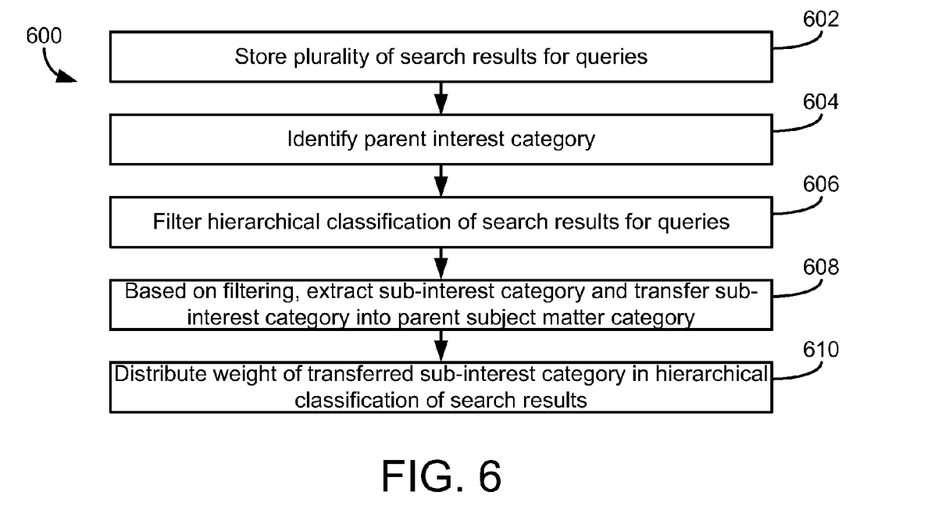
FIG. 6 is an illustration of an example flow diagram in accordance with a described implementation.

FIG. 6 is an illustration of an example flow diagram in accordance with a described implementation. FIG. 6 is an example of a flow diagram of a method 600 for aggregating interest categories based on search queries. Example method 600 may be implemented by various combinations of systems. Example method 600 may be performed online or offline.

At block 602, a plurality of search results for queries may be stored. The queries may be associated with interest categories (e.g., categories). The queries may be searches submitted by a user. A user may perform the search using a search engine to retrieve content. To perform a search, the user may submit a query (e.g., search query), the client device may submit a search query from a web browser or another process to the search engine. The number of times that a user submits a query may be stored. The search results for the query may also be stored. The search results that are relevant to the user, e.g., the user interacts with the search results.

At block 604, a parent interest category is identified. In some implementations, the parent interest category includes a level of a hierarchical classification of the plurality of search results for queries. For example, the parent interest category may be included in a hierarchical classification of content. The hierarchical classification may include a general content module, which may include general content for a topic. The hierarchical classification may include a specific content module, which may include general content for a topic.

The hierarchical classification may include a child interest category beneath the parent interest category in the hierarchical classification. The child interest category may reference a specific content module, which may include specific content for a topic. For example, parent interest categories may have sub-categories, such as parent-child relationships with each other based on their position in the hierarchical classification. For example, a category may be "/food and drink/snacks/candy/hard candy", which may include category "food and drink" (general content), its sub-category "snacks", a further sub-category "candy" and a final sub-category "hard candy." In some implementations, content may belong to more than one interest category. In the example, "food and drink" may be identified as the parent interest category.

At block 606, the hierarchical classification of search results for queries is filtered. For example, the system may filter the number of children or sub-categories to the parent. In some implementations, the system may filter the number of categories based on rank, such as the number of times the user is impressed upon with the categories.

At block 608, a sub-interest category may be extracted and a weighting associated with the sub-interest category may be transferred into the parent interest category based on the filtering. The sub-interest category and or child may be associated with the parent interest category. The system may distribute a number of sub interest categories into the parent interest category. In some implementations, the parent interest category may be removed and distributed among the hierarchical classification of the plurality of search results for queries.

At block 610, the weighting of the transferred sub-interest category is distributed to the hierarchical classification of search results. For example, the transferred sub-interest category may be distributed among the other sub-categories within the hierarchical classification. In some implementations, the weight is discounted based on the relationship between the parent interest category and the sub-interest category. For example, if there are multiple levels, such as 5 levels, of sub-categories, then the system needs to balance between eliminating sub interest categories and assigning the full weight to the parent interest categories, so the system may allocate some of the weight to another sub-interest category rather than the parent interest category. The distribution of the weight, i.e., the redistribution, may be stored in a memory.

The distribution may be retrieved from memory to select content for a user based on the distribution.

Figure 7:
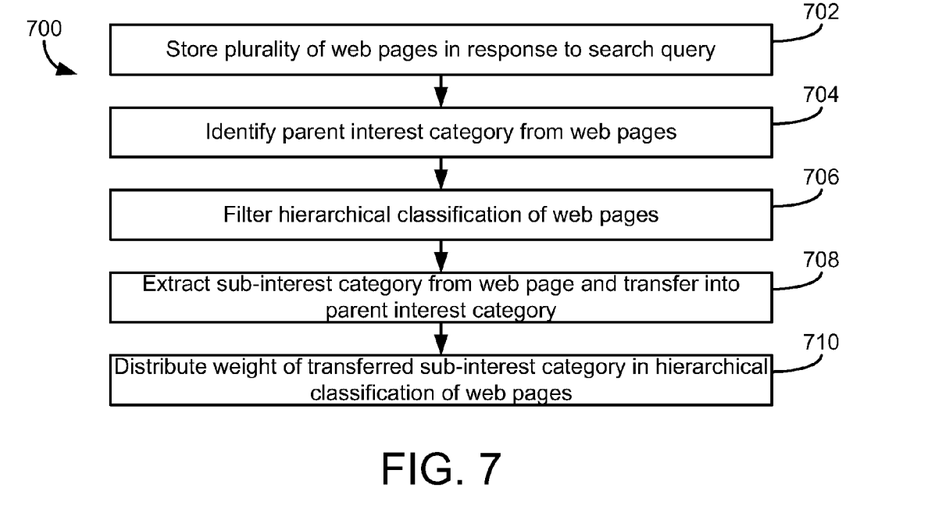
FIG. 7 is an illustration of an example flow diagram in accordance with a described implementation.

FIG. 7 is an illustration of an example flow diagram in accordance with a described implementation. FIG. 7 is an example of a flow diagram of a method 700 for aggregating interest categories based on web pages. Example method 700 may be implemented by various combinations of systems. Example method 700 may be performed online or offline.

At block 702, a plurality of web pages in response to a search query are stored. The web page may appear in response to clicking on a search result, content displayed next to the result, content displayed on another web page, etc. The content viewed on the web page may also be stored by the system.

At block 704, a parent interest category is identified. In some implementations, the parent interest category includes a level of a hierarchical classification of the plurality of web pages. For example, the parent interest category may be included in a hierarchical classification of content, where the content has been retrieved from the web page (e.g., keywords, topics, etc.). The hierarchical classification may include a general content module, which may include general content for a topic. The hierarchical classification may include a specific content module, which may include general content for a topic.

The hierarchical classification may include a child interest category beneath the parent interest category in the hierarchical classification. The child interest category may reference a specific content module, which may include specific content for a topic. For example, parent interest categories may have sub-categories, such as parent-child relationships with each other based on their position in the hierarchical classification. For example, a category may be "/food and drink/snacks/candy/hard candy", which may include category "food and drink" (general content), its sub-category "snacks", a further sub-category "candy" and a final sub-category "hard candy." In some implementations, content may belong to more than one interest category. In the example, "food and drink" may be identified as the parent interest category.

At block 706, the hierarchical classification of web pages is filtered. For example, the system may filter the number of children or sub-categories to the parent. In some implementations, the system may filter the number of categories based on rank, such as the number of times the user is impressed upon with the categories.

At block 708, a sub-interest category may be extracted from the web page and a weighting associated with the sub-interest category may be transferred into the parent interest category based on the filtering. The sub-interest category and or child may be associated with the parent interest category. The system may distribute a number of sub interest categories into the parent interest category. In some implementations, the parent interest category may be removed and distributed among the hierarchical classification of the web pages.

At block 710, the weighting of the transferred sub-interest category is distributed to the hierarchical classification of web pages. For example, the transferred sub-interest category may be distributed among the other sub-categories within the hierarchical classification. In some implementations, the weight is discounted based on the relationship between the parent interest category and the sub-interest category. For example, if there are multiple levels, such as 5 levels, of sub-categories, then the system needs to balance between eliminating sub interest categories and assigning the full weight to the parent interest categories, so the system may allocate some of the weight to another sub-interest category rather than the parent interest category. The distribution of the weight, i.e., the redistribution, may be stored in a memory. The distribution may be retrieved from memory to select content for a user based on the distribution.

Implementations of the interest and the functional operations described in this specification can be implemented in other types of digital electronic circuitry, or in computer software, firmware, or hardware, including the structures disclosed in this specification and their structural equivalents, or in combinations of one or more of them.

Implementations of the interest and the operations described in this specification can be implemented in digital electronic circuitry, or in computer software, firmware, or hardware, including the structures disclosed in this specification and their structural equivalents, or in combinations of one or more of them. The interest described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the interest described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the interest have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   accessing a plurality of search results for multiple different queries submitted by a client device;
   generating an interest category profile for a user identifier associated with the client device, the interest category profile comprising a hierarchical classification of estimated interest categories based on the plurality of search results for the multiple different queries;
   storing the interest category profile in a database, wherein each category of the interest category profile has a weighting associated therewith;
   identifying a parent interest category of the interest category profile, wherein the parent interest category comprises a top level of the hierarchical classification;
   filtering the interest category profile to remove a sub-interest category from the hierarchical classification;
   based on the filtering, extracting the sub-interest category and transferring a weighting associated with the sub-interest category into the parent interest category of the stored interest category profile; and
   distributing the weighting of the sub-interest category to one or more other interest categories of the hierarchical classification.

2. The method of claim 1, wherein the weighting is discounted based on the relationship between the parent interest category and the sub-interest category.

3. The method of claim 1, wherein the distribution of the transferred weighting associated with the sub-interest category to the hierarchical classification of the search results is stored in a memory.

4. The method of claim 3, further comprising:
   retrieving the distribution of the weighting associated with the transferred sub-interest category from memory; and
   selecting content for the user based on the distribution.

5. The method of claim 1, wherein filtering further comprises:
   ranking the hierarchical classification.

6. The method of claim 1, wherein the hierarchical classification comprises:
   a general content module comprising general content for a topic.

7. The method of claim 1, wherein the sub-interest category comprises:
   a child interest category beneath the parent interest category in the hierarchical classification.

8. The method of claim 7, wherein the child interest category references a specific content module comprising specific content for a topic.

9. A computer-implemented method comprising:
   accessing a plurality of web pages in response to a search query submitted by a client device;
   generating an interest category profile for a user identifier associated with the client device, the interest category profile comprising a hierarchical classification of estimated interest categories based on the plurality of web pages;
   storing the interest category profile in a database, wherein each category of the interest category profile has weighting associated therewith;
   identifying a parent interest category of the interest category profile, wherein the parent interest category comprises a top level of the hierarchical classification;
   filtering the interest category profile to remove a sub-interest category from the hierarchical classification;
   based on the filtering, extracting the sub-interest category and transferring a weighting associated with the sub-interest category into the parent interest category of the stored interest category profile; and
   distributing the weighting of the transferred sub-interest category to one or more other interest categories of the hierarchical classification.

10. The method of claim 9, further comprising:
    removing the parent interest category and transferring the weighting associated with the sub-interest category among the hierarchical classification of the plurality of web pages.

11. The method of claim 9, wherein the weighting is discounted based on the relationship between the parent interest category and the sub-interest category.

12. The method of claim 9, wherein the distribution of the transferred weighting associated with the sub-interest category to the hierarchical classification of the web pages is stored in a memory.

13. The method of claim 12, further comprising:
    retrieving the distribution of the weighting associated with the sub-interest category from memory; and
    selecting content for the user based on the distribution.

14. The method of claim 9, wherein the hierarchical classification further comprises:
    a general content module comprising general content for a topic; and
    a specific content module comprising specific content for a topic.

15. A system comprising:
    a tangible computer-readable storage device comprising instructions; and one or more processors coupled to the tangible computer-readable storage device and configured to execute the instructions to perform operations comprising:
    accessing a plurality of web pages in response to a search query submitted by a client device;
    generating an interest category profile for a user identifier associated with the client device, the interest category profile comprising a hierarchical classification of estimated interest categories based on the plurality of web pages;
    storing the interest category profile in a database, wherein each category of the interest category profile has a weighting associated therewith;
    identifying a parent interest category of the interest category profile, wherein the parent interest category comprises a top level of the hierarchical classification;
    filtering the interest category profile to remove a sub-interest category from the hierarchical classification;

based on the filtering, extracting the sub-interest category and transferring a weighting associated with the sub-interest category into the parent interest category of the stored interest category profile; and distributing the weighting of the transferred sub-interest category to one or more other interest categories of the hierarchical classification.

16. The system of claim 15, the operations further comprising:

removing the parent interest category and transferring the weighting associated with the sub-interest category among the hierarchical classification of the plurality of web pages.

17. The system of claim 15, wherein the weighting is discounted based on the relationship between the parent interest category and the sub-interest category.

18. The system of claim 15, wherein the distribution of the transferred sub-interest category to the hierarchical classification of the web pages is stored in a memory.

19. The system of claim 18, further comprising:

retrieving the distribution of the weighting associated with the transferred sub-interest category from memory; and selecting content for the user based on the distribution.

* * * * *